US005594707A

United States Patent [19]
Goto et al.

[11] Patent Number: 5,594,707
[45] Date of Patent: Jan. 14, 1997

[54] FISH FINDER

[75] Inventors: Minoru Goto, Kashiwa; Satoru Watanabe, Tokyo; Minoru Aoki, Chiba; Shuji Konishi, Narashino; Koji Kato, Chiba, all of Japan

[73] Assignee: Uniden Corporation, Tokyo, Japan

[21] Appl. No.: 537,611

[22] Filed: Oct. 2, 1995

[30] Foreign Application Priority Data

Jun. 13, 1995 [JP] Japan .................................. 7-146631

[51] Int. Cl.$^6$ ................................................. G01S 15/96
[52] U.S. Cl. ...................................... 367/111; 367/107
[58] Field of Search ................................ 367/87, 99, 107, 367/111, 131, 910

[56] References Cited

U.S. PATENT DOCUMENTS

| | | | |
|---|---|---|---|
| 4,829,492 | 5/1989 | Choi et al. | 367/110 |
| 4,829,493 | 5/1989 | Bailey | 367/111 |
| 5,065,371 | 11/1991 | Leavell et al. | 367/111 |
| 5,184,330 | 2/1993 | Adams et al. | 367/111 |
| 5,327,398 | 7/1994 | Wansley et al. | 367/108 |

FOREIGN PATENT DOCUMENTS

| | | |
|---|---|---|
| 62-30977 | 2/1987 | Japan . |
| 2-55754 | 11/1990 | Japan . |
| 4-88871 | 8/1992 | Japan . |

*Primary Examiner*—Ian J. Lobo
*Attorney, Agent, or Firm*—Lowe, Price, LeBlanc & Becker

[57] ABSTRACT

A receiver converts an echo received by a transducer to a supersonic echo signal, and a controller measures the depth of obstacles depending on a timing for receiving the supersonic echo signal, obtains an echo level according to quantity of the supersonic echo signal, and determines the condition of the bottom depending on echo levels of a series of supersonic echo signals. A display unit provides a result of detection at a position of corresponding depth scale on a first display area for providing graphic displays of the obstacles as well as the bottom with a depth scale with a gradation or a pattern type corresponding to the echo level. Graphic displays of the echo level are also provided at a position corresponding to depth on a second display area having graphic displays corresponding to depth scale in the first display area.

43 Claims, 15 Drawing Sheets

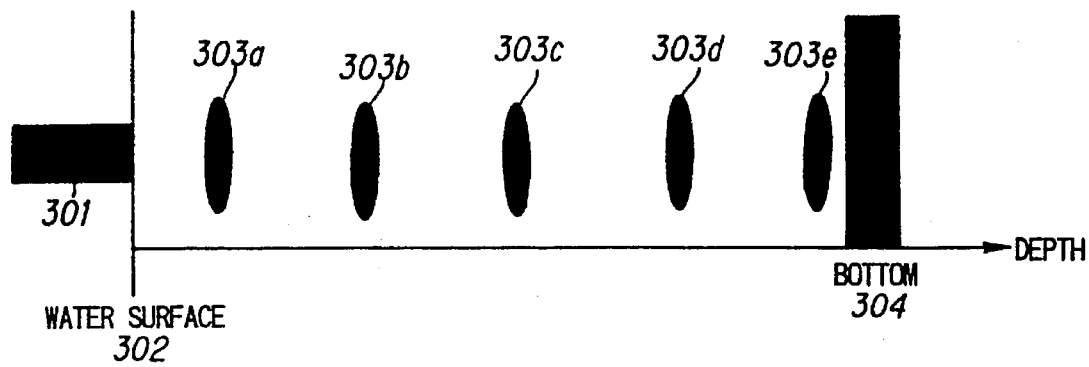
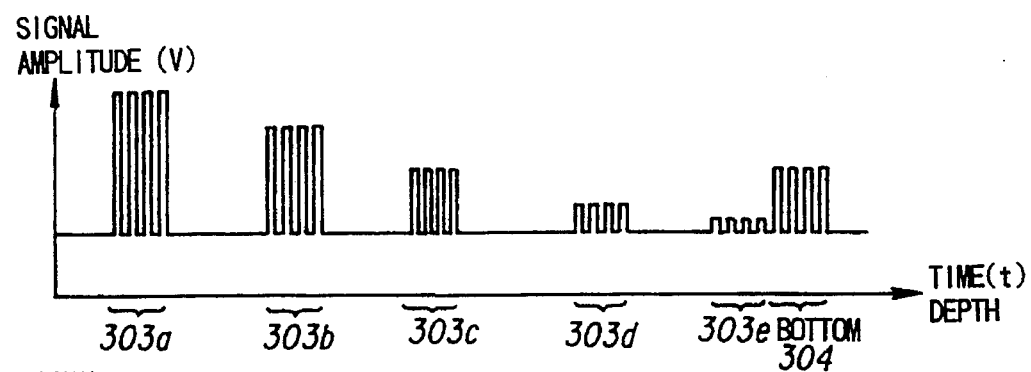
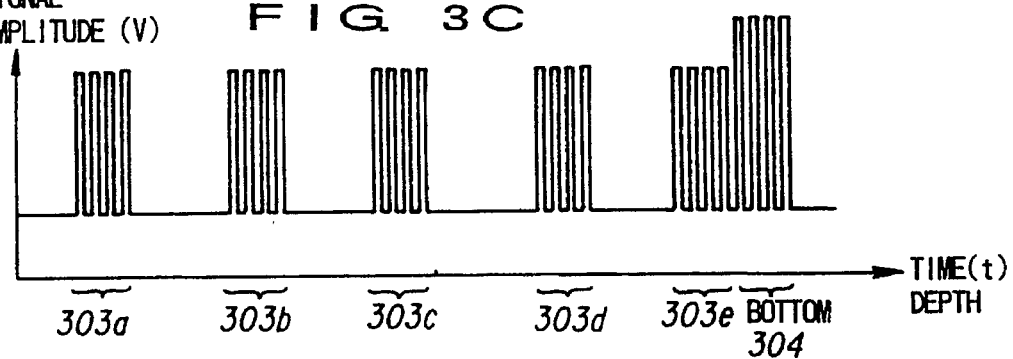

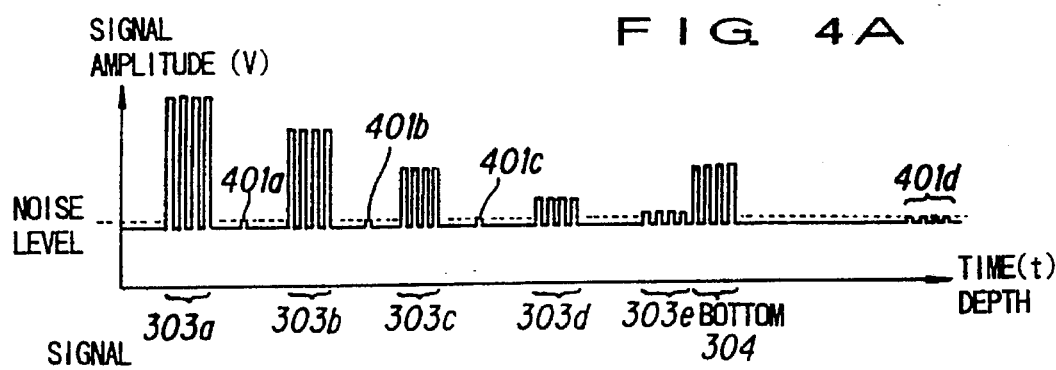
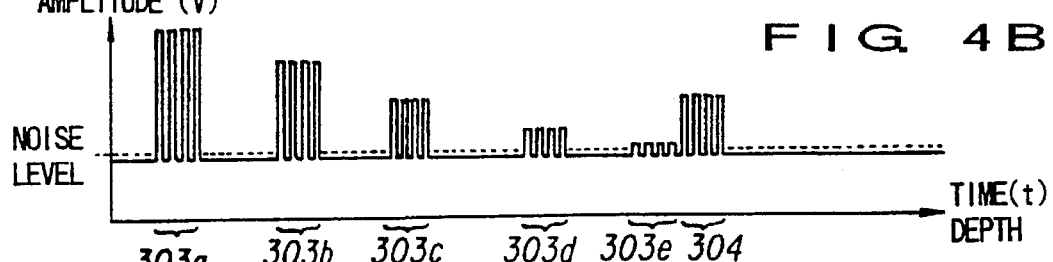
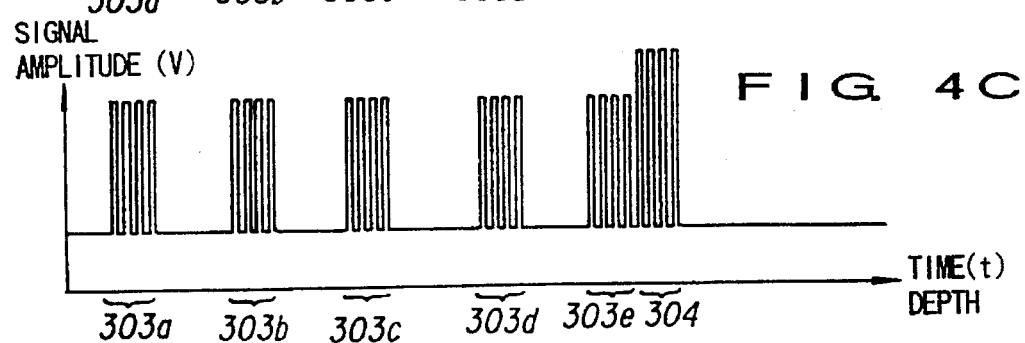
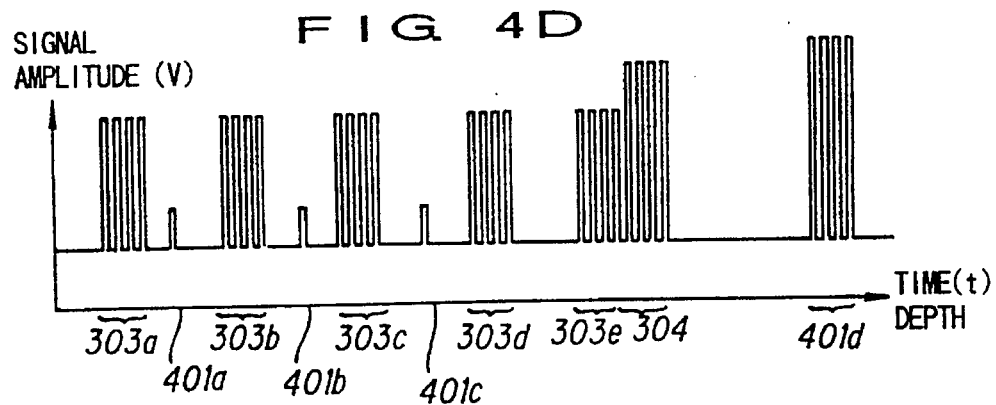

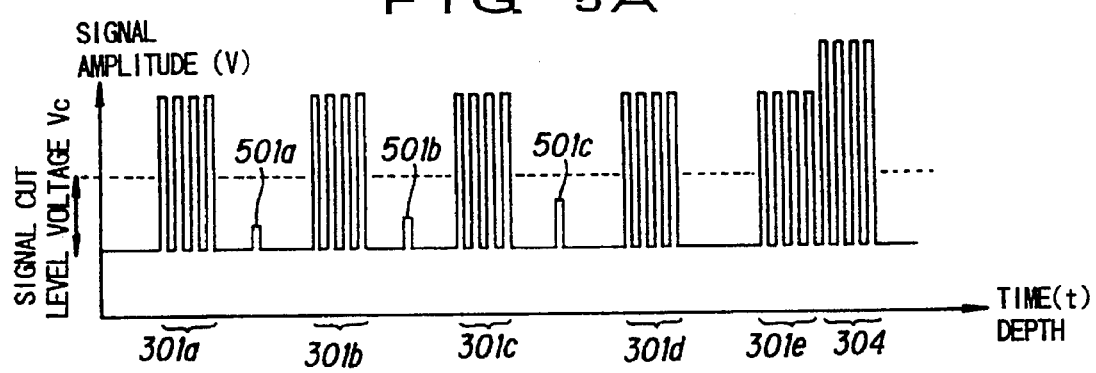
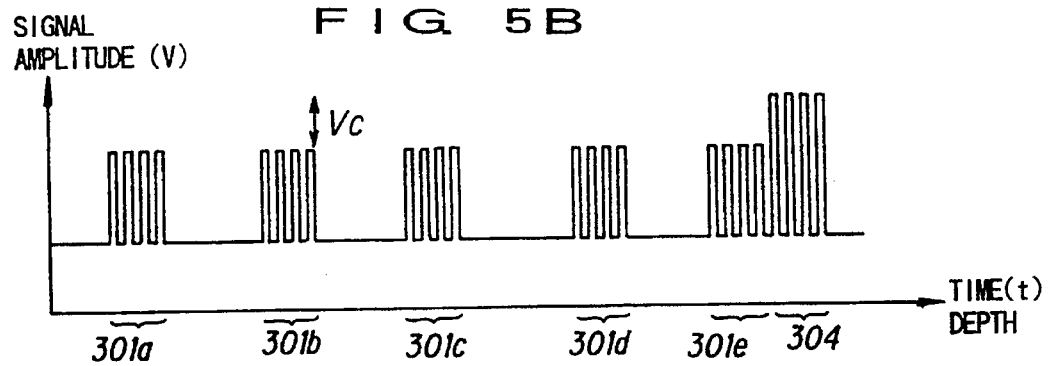

F I G. 9
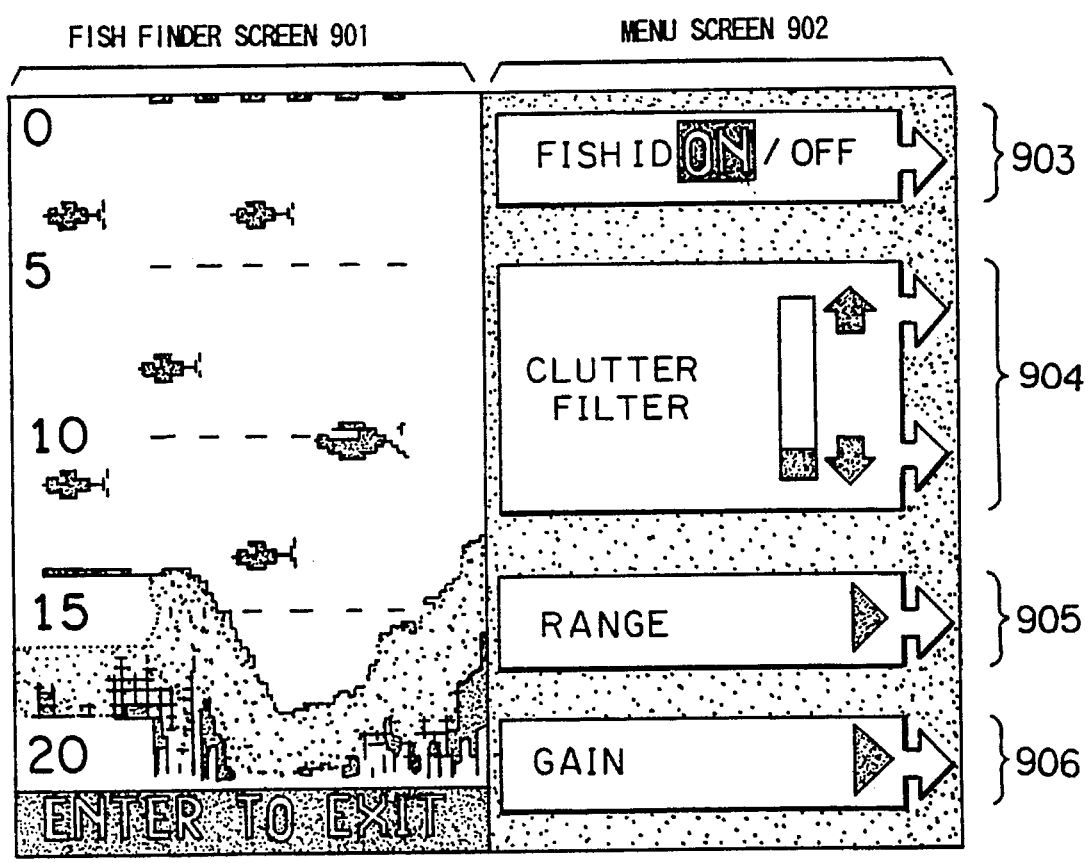

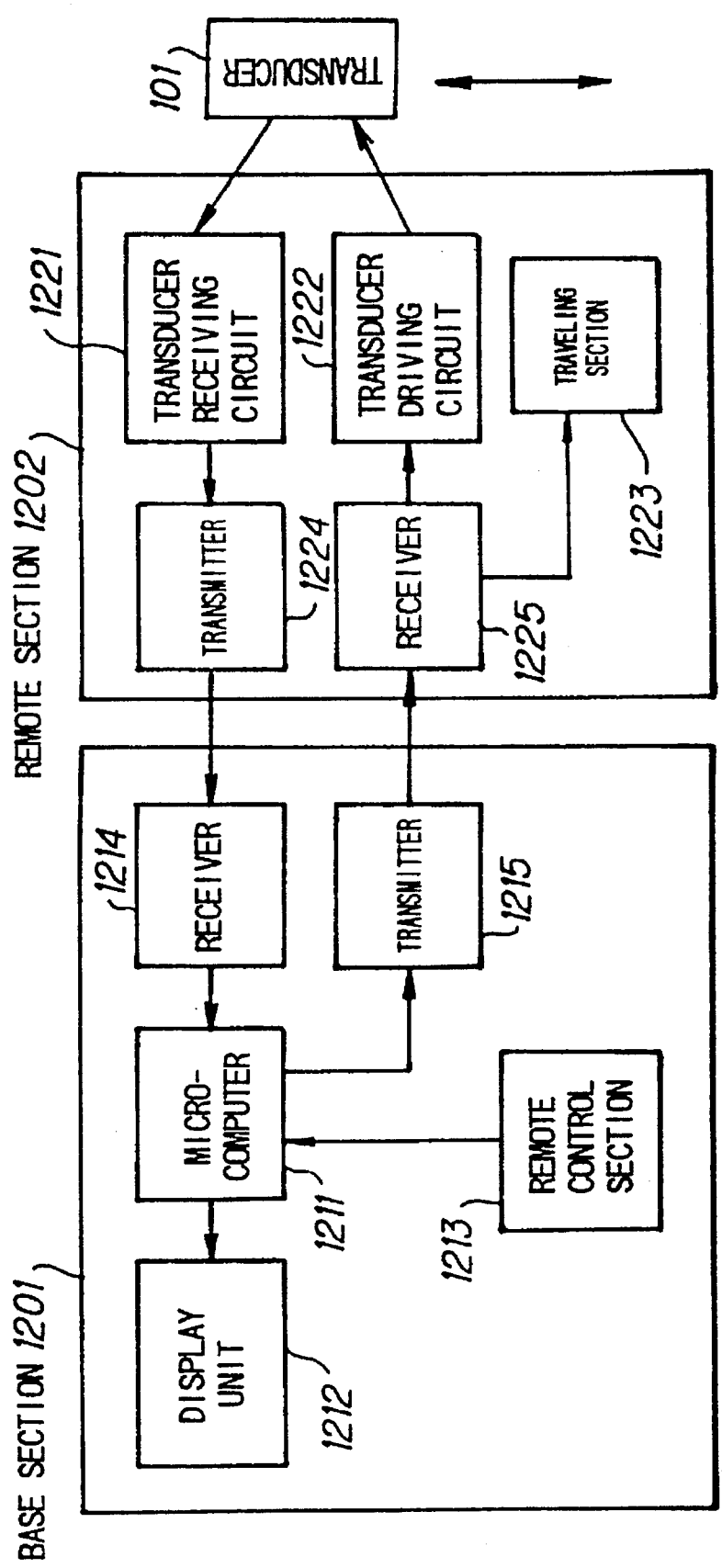
F I G. 12

FISH FINDER

This patent application is the subject of submissions under the Disclosure Document Program, which were filed thereunder by applicants on Oct. 4, 1994, and Jan. 9, 1995, and identified as Disclosure Document Nos. 367273, 363525 and 368204, respectively, with the accompanying fees paid under the provisions of all the Rules and Regulations including 37 CFR §1.21(c).

FIELD OF THE INVENTION

The present invention relates to a fish finder for detecting obstacles under water such as a school of fish, and more particularly to a fish finder which can make accurate determination of bottom conditions by accurately capturing an echo level corresponding to the position of school of fish or the like and can generate a display showing result of detection as a clear image without being affected by supersonic wave attenuation during propagation, noise, foreign materials in or contamination of water, nor by air bubbles or the like.

BACKGROUND OF THE INVENTION

Configuration of the conventional type of fish finder is, for instance, as shown in FIG. 15. In this figure, the conventional type of fish finder comprises a transducer 101, a transducer driving circuit 102, a transducer receiving circuit 103, a comparator 1504, a microcomputer 1505, an attenuator 1506, and a display unit 108.

According to a control signal from the microcomputer 1505, a trigger pulse is transmitted from the transducer driving circuit 102, and a supersonic wave is transmitted, for instance, into sea water from the transducer 101 in response to said trigger pulse.

When a supersonic wave echo from an obstacle under water or the sea bottom is received by the transducer 101, a receiving signal having a voltage level corresponding to the amplitude of the supersonic wave echo is outputted from the transducer 101, this receiving signal is detected and amplified in the transducer receiving circuit 103, and then supplied to the comparator 1504.

In the computer 1504, signals each having a voltage less than a specified value are removed, and the remaining signals are supplied as digital signals each consisting of "1 and 0" to the microcomputer 1505. The microcomputer 1505 provides displays of a dot pattern or an icon on the display unit 108 according to the received digital signals.

Generally, underwater scan by a fish finder is executed in the underwater measurement mode for detecting obstacles or the like under water and in the sea depth measurement mode for detecting the sea bottom, the two modes being switched repeatedly.

Basically, it is known that a supersonic wave echo from the sea bottom is far larger than that from an obstacle or the like under water, and determination in the sea depth measurement mode as to whether a supersonic wave is from the sea bottom or from an obstacle or the like is executed by making use of reflection characteristics. Namely, an attenuation rate in the attenuator 1506 is changed during a certain scanning period under control by the microcomputer 1505, an amplification gain in the transducer receiving circuit 103 is gradually raised from "0", and a supersonic wave echo first received by the microcomputer 1505 (when a prespecified level is surpassed in the comparator 1504) is determined as that from the sea bottom.

In the underwater measurement mode, measurement is executed with an amplification gain in the transducer receiving circuit 103 fixed at a constant value. However, the amplitude of a supersonic wave echo changes according to type of transducer or underwater conditions to be detected, so that attenuation rate of the attenuator 1506 can manually be adjusted by a user. For this reason, to carry out correct measurement, it is necessary for a user to adjust attenuation rate of the attenuator 1506 empirically or by trial and error.

As described above, in the conventional type of fish detector, it is necessary to repeat scanning to obtain an appropriate attenuation rate, and also it is necessary to make the attenuation circuit larger and increase scanning times for obtaining a higher resolution of adjustment level. This impedes device minimization or realization of higher operational speed.

Also in the conventional type of fish finder, there are problems that a display showing a result of detection can not be obtained as a clear image because of influence by attenuation of supersonic waves during propagation, foreign materials in or contamination of sea water, or air bubbles or the like, and that the condition of the sea bottom can not be detected correctly.

SUMMARY OF THE INVENTION

It is an object of the present invention to provide a fish finder which can correctly determine conditions of the sea bottom by accurately capturing an echo level corresponding to a position of a school of fish or the like.

Also it is an object of the present invention to provide a fish finder which can provide a display showing a result of detection as a clear image without being affected by attenuation of supersonic waves during propagation, foreign materials in or contamination of the sea water, nor by air bubbles or the like.

In the fish finder according to the present invention, a receiver converts an echo received by a transducer to a supersonic echo signal, and a controller measures the depth of obstacles depending on a timing for receiving the supersonic echo signal, obtains an echo level according to a physical quantity of the supersonic echo signal, and determines bottom conditions depending on echo levels of a series of supersonic echo signals. A display unit provides a result of detection at a position corresponding depth scale on a first display area for providing graphic displays of the obstacles as well as the bottom with a depth scale having a gradation or a pattern type corresponding to the echo level, and provides graphic displays of the echo level at a position corresponding to depth on a second display area providing graphic displays corresponding to a depth scale in the first display area.

As described above, processing such as determination of the bottom is executed by means of fetching a series of supersonic echo signals into the controller once, so that correction of an attenuation rate (adjustment of sensitivity) in a manner of trial-and-error is not required. Also, differentiation between the bottom and obstacles, such as a school of fish or trash, can clearly be made by means of providing echo levels together with graphic displays. Furthermore, degree of contamination of sea water can be recognized depending on determination as to whether echo levels are distributed uniformly or not. A user can adjust the sensitivity of the finder while watching echo levels, so that precise operation for adjustment can be executed.

In the fish finder according to the present invention, a receiver converts an echo received by a transducer to a supersonic echo signal, a controller measures the depth of obstacles depending on a timing for receiving the supersonic echo signal, corrects the supersonic echo signal according to an attenuation rate associated with propagation of supersonic wave, then obtains an echo level according to a physical quantity of the supersonic echo signal having been subjected to attenuation correction, and also determines the bottom depending on echo levels of a series of supersonic echo signals each subjected to attenuation correction. Also a display unit provides a result of detection at a position of corresponding depth scale on the first display area with a depth scale providing graphic displays of obstacles as well as the bottom with a gradation or a pattern type corresponding to the echo level after the attenuation correction.

As described above, attenuation associated with propagation of supersonic wave can be processed in the controller (with software), so that hardware (a circuit) for executing an attenuation correction is not required, which makes the device minimized, and misdetermination of the bottom caused by noise or obstacles can be suppressed. The bottom can automatically and accurately be detected with stability, and furthermore it is not necessary for a user to adjust sensitivity for each depth. This is because attenuation is automatically corrected in the direction of depth, so that ease of operation of a fish finder is improved.

In the fish finder according to the present invention, a receiver converts an echo received by a transducer to a supersonic echo signal, a controller measures depth of obstacles depending on a timing for receiving the supersonic echo signal, obtains an echo level according to the supersonic echo signal, removes a supersonic echo signal having an echo level less than a specified first level, corrects an attenuation rate associated with propagation of supersonic wave for a supersonic echo signal not having been removed yet, then obtains an echo level according to a physical quantity of the supersonic echo signal after being subjected to attenuation correction, and determines the bottom depending on echo levels of a series of supersonic echo signals each having been subjected to attenuation correction. Also, a display unit provides a result of detection at a position of corresponding depth scale on the first display area with a depth scale providing graphic displays of obstacles as well as the bottom with a gradation or a pattern type corresponding to the echo level after the attenuation correction.

As described above, processing for removing noise from a supersonic echo signal is executed in the controller (with software), so that hardware (a circuit) for removing noise is not be required, which makes the device minimized, and a clear screen image without noise can be displayed on the display unit. Furthermore, determination of the bottom is automatically made together with processing for attenuation correction in the fish finder according to above mentioned invention, and for this reason misrecognition of the bottom caused by noise or the like can be avoided, and the bottom can automatically and accurately be detected with stability.

As a result, the correction of an attenuation rate (adjustment of sensitivity) in a manner of trial-and-error is not required like that in the conventional type thereof. Differentiation between the bottom and obstacles such as a school of fish or trash can clearly be made by means of providing echo levels together with graphic displays, and furthermore a degree of contamination of sea water can be recognized depending on determination as to whether echo levels are distributed uniformly or not, also a user can adjust sensitivity of the finder while watching echo levels, and for this reason a fish finder easily enabling precise operation for adjustment can be provided.

Hardware for executing an attenuation correction is not required, which makes the device minimized, and misdetermination of the bottom caused by noise or obstacles can be suppressed, the bottom can automatically and accurately be detected with stability. Furthermore, it is not necessary for a user to adjust sensitivity for each depth because attenuation is automatically corrected in the direction of depth, so that a fish finder of which easiness of operation is improved can be provided.

Hardware for removing noise is also not required, which makes the device minimized, and a clear screen image without noise can be displayed on the display unit. Furthermore, determination of the bottom is automatically made together by processing for attenuation correction in the fish finder according to above-mentioned invention. For this reason a fish finder in which misrecognition of the bottom caused by noise or the like can be avoided and the bottom can automatically and accurately be detected with stability can be provided.

Hardware for removing unnecessary echo elements is not required, which makes the device minimized, and a clear screen image without unnecessary echo elements can be displayed on the display unit. Furthermore, determination of the bottom is automatically made together by processing for attenuation correction in the fish finder according to above-mentioned invention. For this reason, a fish finder in which misrecognition of the bottom caused by noise or the like can be avoided and the bottom can automatically and accurately be detected with stability can be provided.

Other objects and features of this invention will become understood from the following description with reference to the accompanying drawings.

BRIEF DESCRIPTION OF THE DRAWINGS

FIGS. 3A–C are explanatory views for explanation of a process for correcting attenuation in Embodiment 2;

FIGS. 4A–D are explanatory views for explanation of a process for removing noise in Embodiment 3;

FIGS. 5A, B are explanatory views for explanation of a process for correcting sensitivity in Embodiment 4;

FIG. 9 is an explanatory view for explanation of an example of display screen of the display device providing a menu screen with a fish finder screen in Embodiment 5.

FIG. 12 is a block diagram of a fish finder according to Embodiment 7 of the present invention;

DESCRIPTION OF THE PREFERRED EMBODIMENT

Detailed description is made hereinafter for a fish finder according to the present invention in the order of [Embodiment 1], [Embodiment 2], [Embodiment 3], [Embodiment 4], [Embodiment 5], [Embodiment 6], [Embodiment 7], and [Embodiment 8] with reference to the related drawings.

[EMBODIMENT 1]

Figure 1:
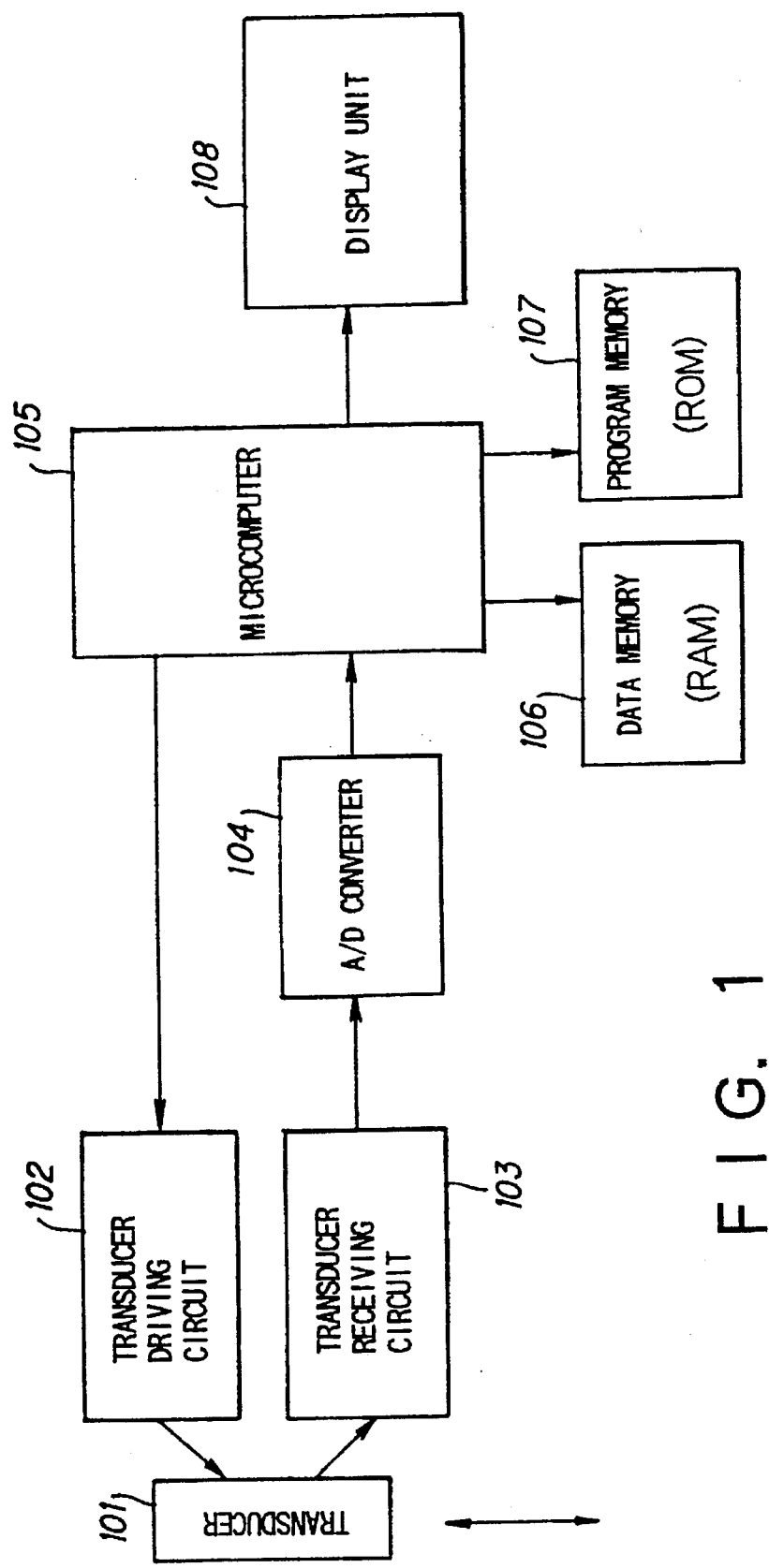
FIG. 1 is a block diagram of a fish finder according to an embodiment of the present invention.

FIG. 1 is a block diagram of the fish finder according to Embodiment 1 of the present invention.

In the figure, the fish finder of the present embodiment comprises a transducer 101, a transducer driving circuit 102, a transducer receiving circuit (receiver) 103, A/D converter 104, microcomputer (controller) 105, data memory (RAM) 106, program memory (ROM) 107 and display unit (display unit) 108.

The transducer 101 transmits a supersonic wave into water, and receives an echo from an obstacle under water. The transducer receiving circuit 103 is a receiver for converting the echo received by the transducer 101 to a supersonic echo signal, and the controller for measuring the depth of obstacles depending on a timing for receiving the supersonic echo signal, obtaining an echo level depending on a physical quantity of the supersonic echo signal, and determining the bottom depending on echo levels of a series of supersonic echo signals is realized by the microcomputer 105, the data memory 106, and the program memory 107.

Figure 2:
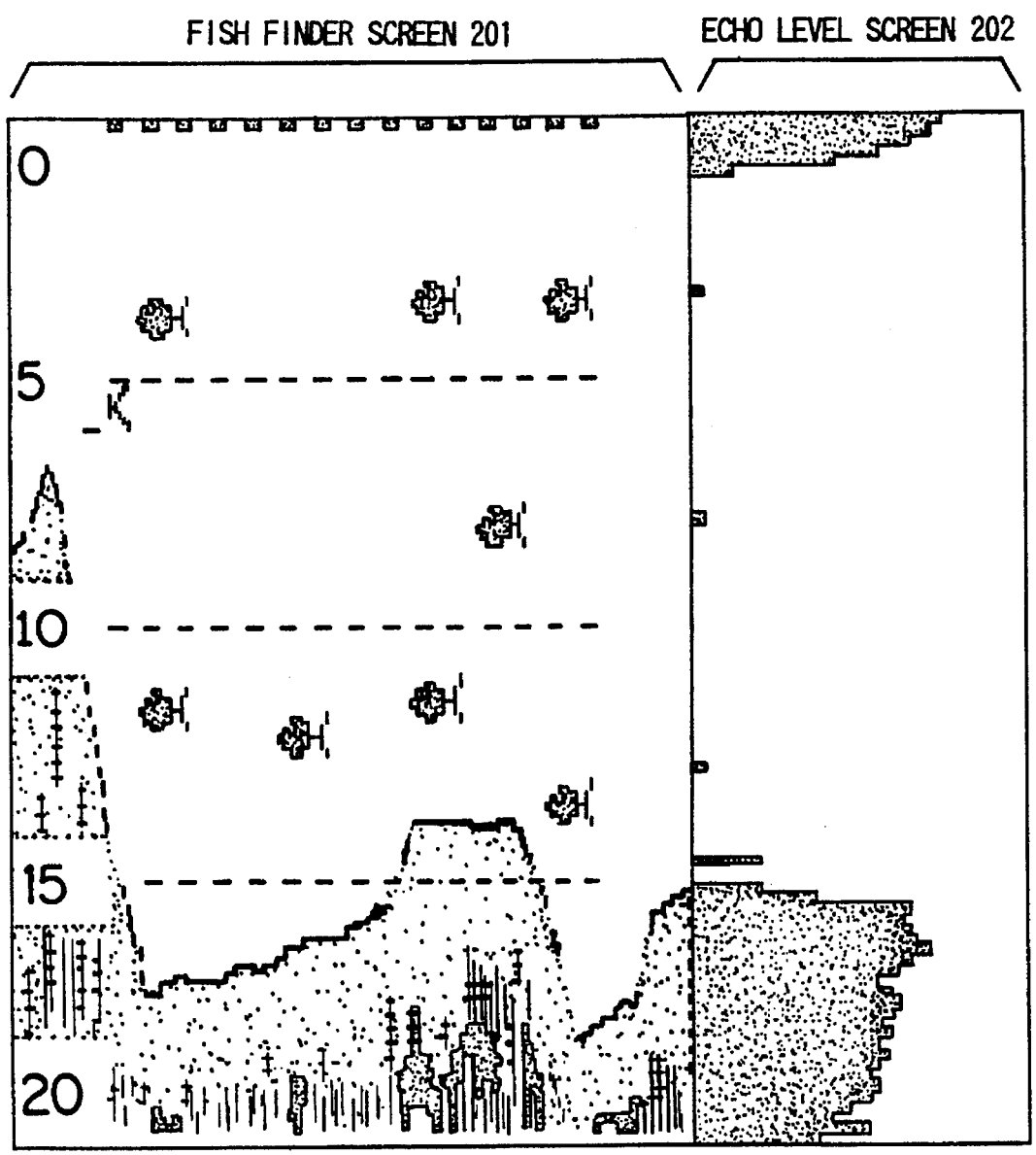
FIG. 2 is an explanatory view showing an example of a display screen of the display device in Embodiment 1.

The display unit 108, as shown in FIG. 2, provides the fish finder screen (first display area) 201 with the depth scale for providing graphic displays of the obstacles as well as the bottom, and the echo level screen (second display area) 202 for providing graphic displays of the echo level corresponding to the depth scale in the fish finder screen 201.

Under control of the microcomputer 105, the result of detection is displayed at a position of corresponding depth scale on the fish finder screen 201 with a gradation or a pattern type corresponding to the echo level, and the echo level is provided by graphic displays at a position of corresponding depth on the echo level screen 202.

Next, a description is made for the fish finder of the present embodiment. At first, a trigger pulse is transmitted from the transducer driving circuit 102 according to a control signal from the microcomputer 105, and a supersonic wave is transmitted from the transducer 101 by responding to the trigger pulse, for instance, into the sea.

If the supersonic echo signal from the sea or sea bottom is received by the transducer 101, a received signal having a voltage level corresponding to the strength of the supersonic echo is outputted from the transducer 101, and the received signal is amplified at the transducer receiving circuit 103 and detected, then supplied to the A/D converter 104. Furthermore, an output from the transducer receiving circuit 103 is converted toga digital signal by the A/D converter 104 to be supplied to the microcomputer 105.

In the microcomputer 105, an optimal threshold level is obtained from the obtained digital signal, and processing for finding fish is executed with the signal cut off at that level. With this feature, data with high resolution can be obtained for one scan, and thus high-speed processing is made possible.

Also, data (an echo level) obtained through processing for finding fish is processed into to a bar graph in real time and displayed together with a fish finding display. FIG. 2 shows an example of a display screen in the present embodiment. The left side of the screen is a fish finder screen 201 and the right side of the screen is an echo level screen 202.

In a conventional type of display, a school of fish is indicated with a display of an area in proportion to signal strength of an echo signal, but by displaying signal amplitude together with the area described above, differentiation among the bottom, a school of fish, or trash or the like can clearly be made. Also, the degree of turbidity of sea water can be recognized depending on the determination as to whether distribution of the bar graph (signal amplitude) is uniform or not. Furthermore, a user can adjust a display gain (sensitivity) while referring to the bar graph (signal amplitude), with the effect that appropriate adjustment that can easily be operated can be obtained.

[EMBODIMENT 2]

Next, description is made for the fish finder according to Embodiment 2 of the present invention. Configuration of the fish finder in the present embodiment is almost equivalent to that in Embodiment 1 (FIG. 1). The present embodiment is characterized in processing for attenuation correction in signal processing for the microcomputer 105, and detailed description is made therefor with reference to the explanatory view shown in FIG. 3.

Generally, when transmitting a supersonic wave into water and receiving a reflected echo of the supersonic wave, the supersonic wave is attenuated according to various causes during its promulgation. That is, attenuation caused by its diffusion, attenuation caused by its absorption, and loss caused by its reflection or the like. In the fish finder of the present embodiment, attenuation during propagation is corrected by software processing in the microcomputer 105 (the program in the program memory 107).

FIG. 3A shows a result after processing for fish finding has been executed, namely the contents to be originally indicated. In the figure, designated at the reference numeral 301 is a transducer, at 302 a water surface, at 303a to 303e each school of fish, and at 304 the bottom.

Also FIG. 3B shows, when an object to be measured is in a state like that in FIG. 3A, a strength of signal received by the microcomputer 105, displays signal strength of a supersonic echo signal. It can be seen how a supersonic echo signal is being attenuated in association with the depth it reaches according to the attenuation during propagation described above. Namely, sampling data of the supersonic echo signal described above is supplied to the microcomputer 105, and stored in the data memory 106.

In processing for attenuation correction, a rate of attenuation correction Vg in accordance with each depth is computed according to the following expression. Herein, X0 indicates the reference depth (for instance, set to X0=1 [m]), and X indicates depth:

$$Vg=20\% \log (X0/X)[dB] \qquad (1)$$

To each sampling data, attenuation correction is executed by adding an attenuation correction rate Vg corresponding to the depth, and each sampling data stored in the data memory 106 is rewritten to the data obtained after attenuation correction. FIG. 3C shows signal amplitude of the supersonic echo signal after being subjected to processing for attenuation correction.

Then a signal of strongest level in signal amplitude is searched for among sampling data after attenuation correction and the portion thereof is regarded as the bottom 304, and difference of graduation is made or pattern types are changed for each signal level of each sampling data, which are outputted and displayed on the display unit 108 as shown, for instance, in FIG. 2.

According to the processing for attenuation correction described above, even when obstacles of an identical type (e.g. school of fish 303a to 303e) are present each at a different depth, it is possible for them to be processed as a signal in the identical level, so that the identical graduation or the identical type of pattern is outputted as a display on the display unit 108.

Also, when the depth of the bottom 304 is large, a supersonic echo signal becomes, normally, a low level signal according to attenuation during propagation, and sometimes becomes lower than the level of a supersonic echo signal from obstacles such as a school of fish 303a which is shallow in depth, so that the bottom 304 can be failed to be recognized. However, determination of the bottom 304 can accurately be made by processing for attenuation correction according to the present embodiment.

As described above, with the fish finder of the present embodiment, attenuation of a supersonic wave in the direction of depth is corrected by software processing in the microcomputer 105, so that hardware for automatic correction of the attenuation is not required, which makes the device minimized, and also obstacles of an identical type being at different depths can be displayed with the same graduation and the same type of patterns. For this reason, the effect that obstacles such as a school of fish, the bottom, and trash or the like can easily be recognized by users can be achieved.

Also misdetermination of the bottom caused by noise, obstacles under water, or a second echo, third echo, fourth echo or the like is suppressed, and then the bottom can automatically and accurately be detected with stability. Furthermore, attenuation in the direction of the depth is automatically corrected, so that it is not necessary for a user to adjust sensitivity of the device for each depth, and thus ease in operation of the fish finder is improved.

[EMBODIMENT 3]

Next, a description is made for the fish finder according to Embodiment 3 of the present invention. Configuration of the fish finder in the present embodiment is almost equivalent to that in Embodiment 1 (FIG. 1). The present embodiment is characterized in processing for removal of noise in signal processing for the microcomputer 105, and the detailed description is made therefor with reference to the explanatory view shown in FIG. 4.

Generally, in a fish finder, noise such as that transmitted from a microcomputer 105 or that transmitted from a A/D converter 104 or the like is disadvantageously added to a supersonic echo signal. In the fish finder of the present embodiment, the noise added to the supersonic echo signal is removed by means of software processing in the microcomputer 105 (the program in the program memory 107).

FIG. 4A shows the signal amplitude of a supersonic echo signal in a case where an object to be measured is in a state like that shown in FIG. 3A and noise is added to the supersonic echo signal. In the figure, the reference numerals 401a to 401d each show a portion of the supersonic echo signal generated caused by noise. Also in FIG. 4A, a supersonic echo signal is attenuated in association with the depth according to attenuation during propagation. Namely, sampling data of the supersonic echo signal described above is supplied to the microcomputer 105, and stored in the data memory 106.

If the sampling data like that in FIG. 4A is subjected to processing for attenuation correction like that in Embodiment 2, an attenuation correction rate Vg is also added to noise elements 401a to 401d. The noise elements each may be treated as a meaningful signal level as shown in FIG. 4D, and hence each noise element is disadvantageously outputted and displayed on the display unit 108. Also, the noise 401d which is at a larger depth than the element 304 corresponding to the bottom may be treated as a stronger signal in signal strength than the signal element 304 for the bottom according to processing for attenuation correction, which causes automatic determination of the bottom to fail.

Therefore, in the fish finder of the present embodiment, before processing for attenuation correction, noise included in the fish finder itself is previously measured, a supersonic echo signal not reaching a preset noise level Vn according to the measurement described above is removed, and the data in the data memory 106 is rewritten to the sampling data shown in FIG. 4B. Namely, the sampling data in FIG. 4B is subjected to attenuation correction by adding thereto the attenuation correction rate Vg according to depth, and the sampling data in the data memory 106 is furthermore rewritten to the data obtained after attenuation correction. FIG. 4C shows signal amplitude of the supersonic echo signal subjected to processing for attenuation correction after processing for removal of noise.

As described above, with the fish finder of the present embodiment, noise from the supersonic echo signal is removed by software processing in the microcomputer 105, so that hardware for removing noise is not required, which makes the device minimized, and in addition a clear screen image with no noise can be outputted and displayed on the display unit 108. Furthermore, in automatic determination of the bottom associated with processing for attenuation correction, misrecognition caused by noise can be avoided, which makes it possible to automatically and accurately detect the bottom with stability.

[EMBODIMENT 4]

Next, a description is made for the fish finder according to Embodiment 4 of the present invention. Configuration of the fish finder of the present embodiment is almost equivalent to that in Embodiment 1 (FIG. 1). The present embodiment is characterized in processing for correcting sensitivity in the signal processing for the microcomputer 105, and the detailed description is made therefor with reference to the explanatory view shown in FIG. 5.

Obstacles such as trash or the like other than schools of fish which are objects to be detected are generally floating under water, and echoes from trash in or turbidity of sea water are inevitably included in supersonic echo signals in the fish finder. In the fish finder of the present embodiment, unnecessary echoes included in a supersonic echo signal described above are removed by the software processing for the microcomputer 105 (the program in the program memory 107).

FIG. 5A shows the signal amplitude of a supersonic echo signal in a case where an object to be measured is in a state like that in FIG. 3A, and an unnecessary echo is included in the supersonic echo signal. In the figure, the reference numerals 501*a* to 501*c* each show supersonic echo elements caused by trash in or turbidity of water. It should be noted that FIG. 5A indicates sampling data at least after being subjected to processing for attenuation correction in Embodiment 2, and before processing for sensitivity correction, the sampling data for supersonic echo signal described above is assumed to be stored in the memory data 106.

If the sampling data as shown in FIG. 5A is outputted and displayed on the display unit 108 as it is as a result of detection, echo elements caused by trash in or contamination of sea water may be displayed thereon, which may cause a user to misrecognize the unnecessary echo elements as necessary ones.

Therefore, in the fish finder of the present embodiments, after processing for attenuation correction, the sampling data in the data memory 106 is reduced by a rate prespecified by a user for a signal cut level Vc, so that echo elements caused by trash in or turbidity of water are removed, and the data in the data memory 106 is rewritten to the sampling data as shown in FIG. 5B.

As described above, with the fish finder of the present embodiment, echo elements caused by trash in or turbidity of water are removed from a supersonic echo signal by means of software processing in the microcomputer 105, so that hardware for removal of unnecessary echo elements is not required, which makes the device minimized, and also a clear screen image with no unnecessary echo element can be outputted and displayed on the display unit 108.

Figure 6:
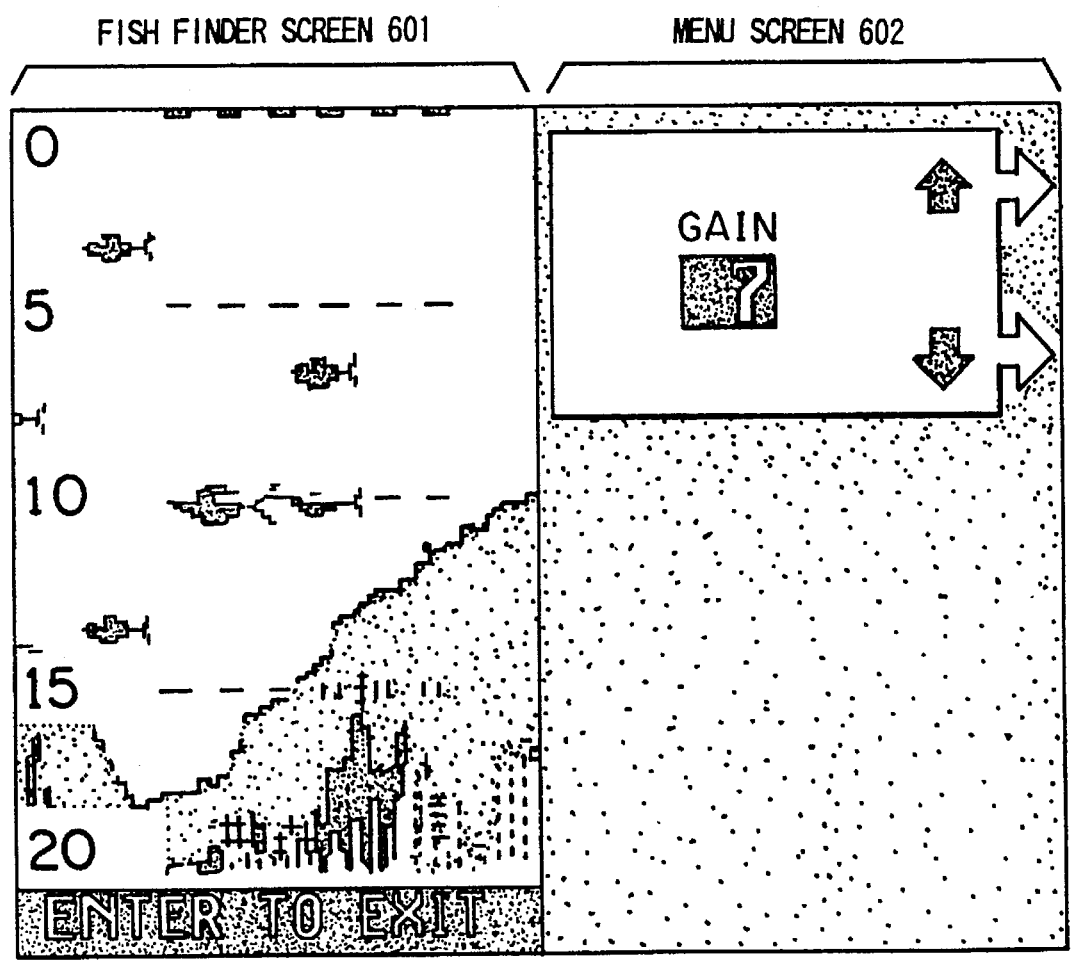
FIG. 6 is an explanatory view showing an example of display screen of the display device providing a menu screen with a fish finder screen in Embodiment 4.

Furthermore, a signal cut off level Vc can freely be set by a user according to underwater environmental conditions. FIG. 6 shows a display screen of the display unit 108 providing a menu screen 602 for setting a signal cut off level Vc together with the fish finder screen. A user can obtain an optimal image desired according to the function of free setting.

[EMBODIMENT 5]

Next description is made for the fish finder according to Embodiment 5 of the present invention. Configuration of the fish finder of the present embodiment is almost equivalent to that in Embodiment 1 (FIG. 1). The present embodiment is characterized in processing for removing bubble noise in the signal processing for the microcomputer 105, and the detailed description is made therefor with reference to the explanatory views shown in FIG. 7 and FIG. 8.

Generally, air bubbles caused by screws of a ship are generated right under the water surface, echoes due to the air bubbles described above are inevitably included in a supersonic echo signal for the fish finder. In the fish finder of the present embodiment, noise caused by air bubbles included in a supersonic echo signal is removed by software processing (the program in the program memory 107) in the microcomputer 105.

Figure 7A:
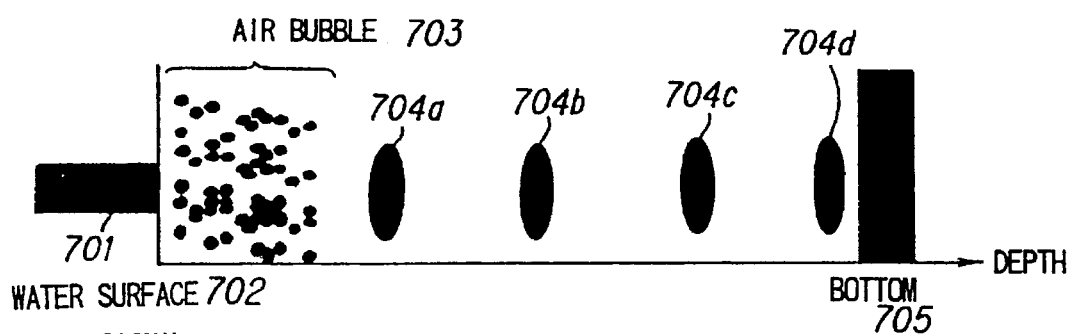
FIGS. 7A, B are explanatory views (No. 1) for explanation of a process for removing bubble noise in Embodiment 5.

FIG. 7A shows schematically an object to be detected. In the figure, designated at the reference numeral 701 is a transducer, at 702 the water surface, at 703 air bubbles, at 704*a* to 704*d* each a school of fish, and at 705 the bottom.

Figure 7B:
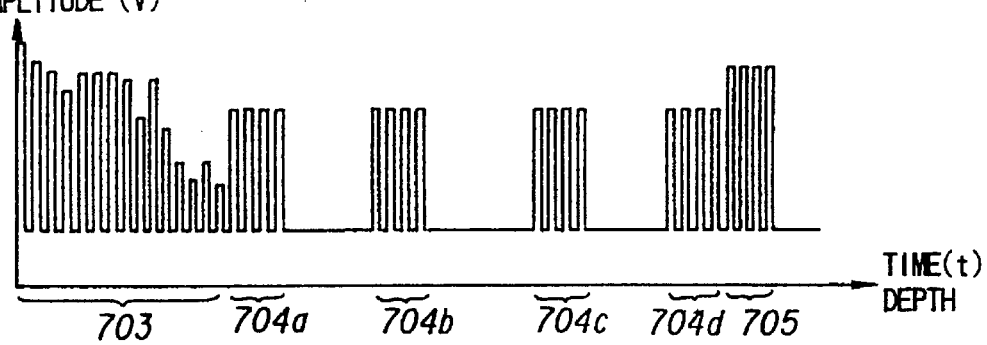

FIG. 7B shows the signal amplitude of a supersonic echo signal in a case where an object to be measured is in a state like that in FIG. 7A and bubble noise is included in a supersonic echo signal. It should be noted that FIG. 7B shows sampling data at least after being subjected to processing for attenuation correction in Embodiment 2, and before processing for removing bubble noise, and the sampling data of a supersonic echo signal described above is assumed to be stored in the data memory 106.

If the sampling data as shown in FIG. 7B is outputted and displayed on the display unit 108 as it is as a result of detection, there is sometimes a case where an echo element of the bubble noise 703 has a larger signal amplitude than the echo level of the bottom 705, and in this case automatic recognition of the bottom may fail. In addition, unnecessary echo elements caused by air bubbles are also displayed, which may cause misrecognition by a user.

Therefor, in the fish finder of the present embodiment, data within a specified range of depth among sampling data in the data memory 106 is subtracted by a rate of signal cut off level preset by a use.

Figure 8A:
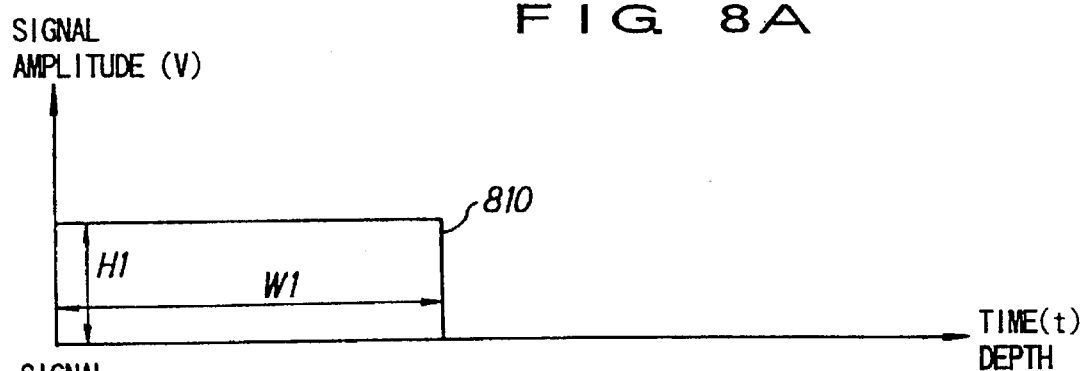
FIGS. 8A–C are explanatory views (No. 2) for explanation of a process for removing bubble noise in Embodiment 5.
Figure 8B:
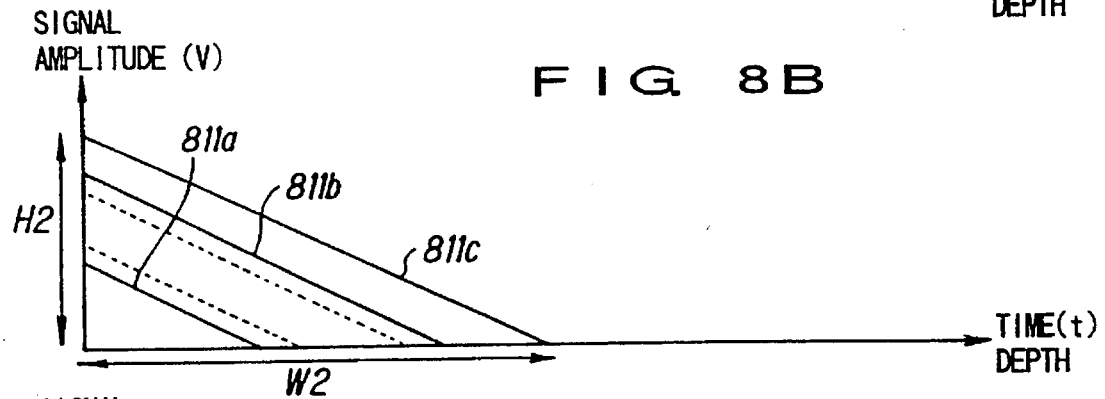

It should be noted that setting by a user, as shown in FIG. 8A, is executed by specifying a depth range W1 as well as a signal cut off level H1. Also, as shown in FIG. 8B, a signal cut off level H2 in a depth range W2 as well as a water surface 702 may be specified, and a rate of signal cut off level which is a functional value of depth may be subtracted from the sampling data in the depth range W2.

Figure 8C:
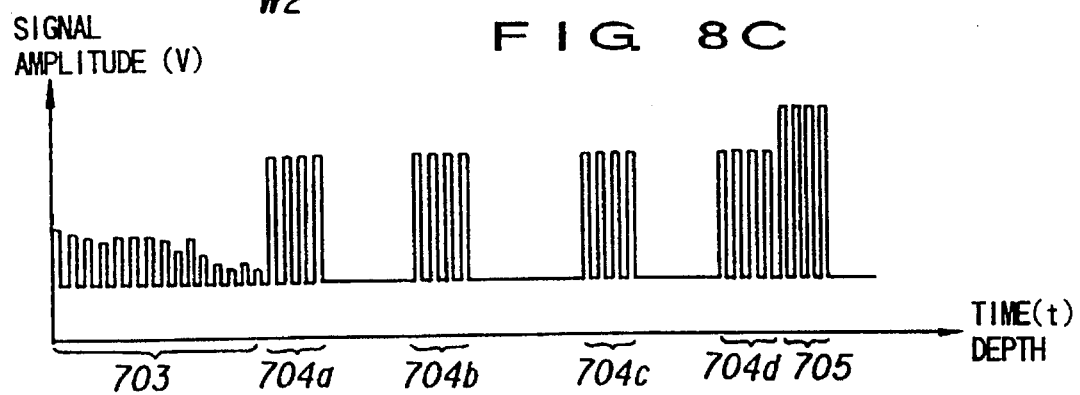

With this feature, unnecessary echo elements due to air bubbles 703 are removed or the level thereof is reduced, and then the sampling data in the data memory 106 is rewritten as the sampling data as shown in FIG. 8C.

As described above, with the fish finder of the present embodiment, noise caused by air bubbles in a supersonic echo signal is removed by software processing for the microcomputer 105, so that hardware for removing unnecessary echo elements is not required, which makes the device minimized. Also, a clear screen image with no unnecessary echo element can be outputted and displayed on the display unit 108, misrecognition caused by noise in automatic determination of a bottom can be avoided, and the bottom can automatically and accurately be detected with stability.

Furthermore, a signal cut off level and a range of depth can freely be set by user according to conditions for detection. FIG. 9 shows a display screen of the display unit 108 providing thereon a screen menu 902 for setting a signal cut off level together with a fish finder screen 901. With this free setting, a user can obtain an optimal image desired.

It should be noted that, in an example of a display screen shown in FIG. 9, a user can set a menu as it is required on the screen menu 902. The reference numeral 903 indicates an ON/OFF setting switch for fish ID, and with this switch, the method for displaying on the fish finder screen 901, namely a display of an image under the sea with a dot pattern will be switched to a display with a fish icon, or vice versa.

Also, the reference numeral 904 indicates a setting menu for a flutter filter, wherein a signal cut off level H1 or H2, and a range of depth W1 or W2 are set. The reference numeral 905 indicates a setting menu for a range, wherein a range of depth scale is set on the fish finder screen 901. Furthermore, the reference numeral 906 indicates a setting menu for a gain, wherein a signal cut off level Vc is set. A fish finder which has all the functions in Embodiment 2, Embodiment 3, Embodiment 4, and Embodiment 5 as described above can also be constructed. Next description is made for the general processing in this case with reference to the flow chart shown in FIG. 10.

Figure 10A:
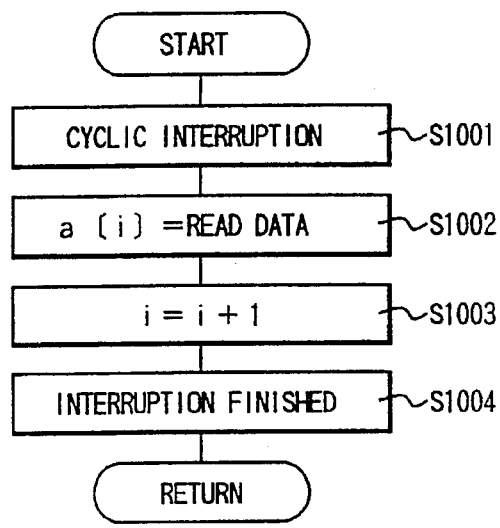
FIGS. 10A, B are flow charts for explanation of a general process for a fish finder including steps in Embodiment 2, Embodiment 3, Embodiment 4, and Embodiment 5.

FIG. 10A is a flow chart for explanation of a processing for fetching the sampling data executed by the microcomputer 105.

At first, in Step S1001, a cyclic interruption is made from the microcomputer 105 to the transducer driving circuit 102, and a supersonic wave is transmitted from the transducer 101 into the water in response to a trigger pulse outputted from the transducer driving circuit 102.

Then, in Step S1002, a supersonic echo from obstacles under water or from the sea bed is received by the transducer 101, a supersonic echo signal consisting of a digital value is obtained from the A/D converter 104, and is stored as read data a [i] in the data memory 106.

Then, in Step S1003, a sampling counter i is incremented, and an interruption is finished in Step S1004. The processing for fetching a series of sampling data as described above is repeated a specified number of times (MAX times), and the read data a [i]: i=0 to MAX−1 is generated in the data memory 106.

Figure 10B:
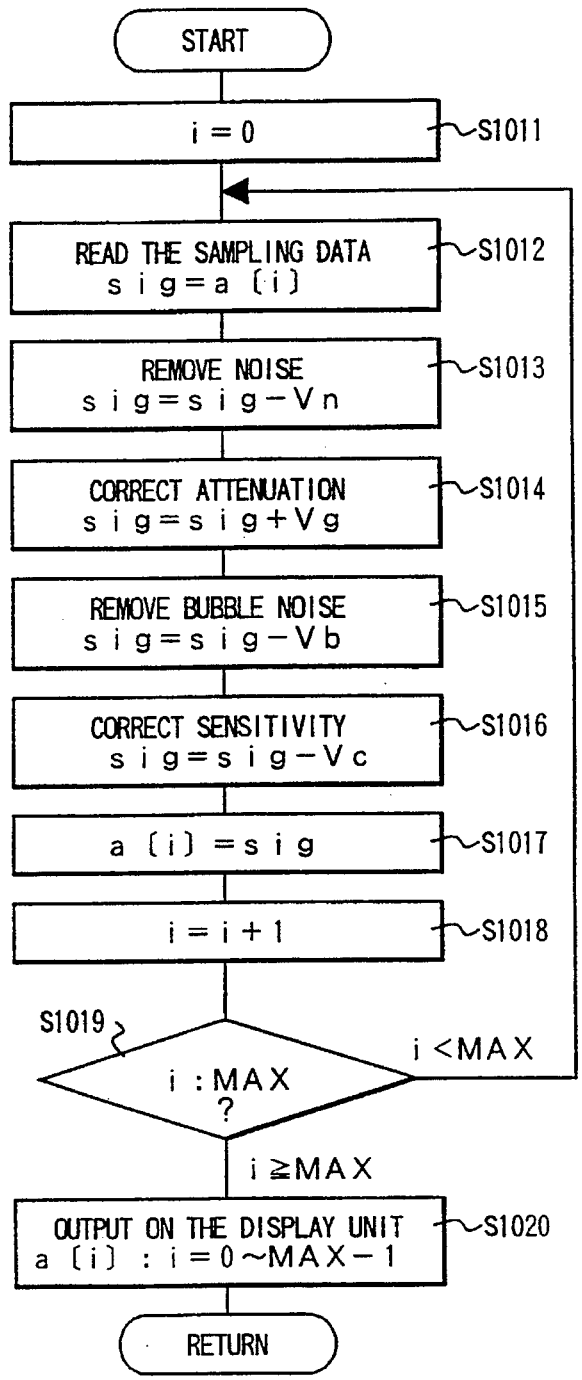

FIG. 10B is a flow chart for explanation of each processing for removing noise, correcting attenuation, removing bubble noise, and correcting sensitivity executed by the microcomputer 105 after fetching the sampling data.

At first, in Step S1011, the sampling counter i is cleared to "0", and in Step S1012, the sampling data a [i] is read from the data memory 106 to be set to a variable sig.

Then, in Step S1013, processing for removing noise is executed as described in Embodiment 3. Namely, a noise level Vn is subtracted from the variable sig to be set to a variable sig, and a supersonic echo signal not reaching the noise level Vn is removed.

Then, in Step S1014, attenuation described in Embodiment 2 is corrected. Namely a rate of attenuation correction Vg is added to the variable sig corresponding to the depth to be set to a variable sig, and then attenuation during propagation is corrected.

Then, in Step S1015, processing for removing bubble noise is executed as described in Embodiment 5. Namely, if bubble noise is in a specified range of depth W1 or W2, a bubble noise level Vb is subtracted from the variable sig to obtain a variable sig, and unnecessary echo elements caused by air bubbles are either removed or reduced. It should be noted that a bubble noise level Vb is specified by signal cut off level H1 if in FIG. 8A, and by signal cut off level H2 if in FIG. 8B respectively.

Furthermore, in Step S1016, processing for correcting sensitivity described in Embodiment 4 is executed. Namely, a signal cut off level Vc is subtracted from the variable sig to obtain a variable sig, and thereby supersonic echo elements caused by trash or dirt underwater are removed.

Then in Step S1017, a value of a variable sig is written at read data a[i] in the data memory 106, in Step S1018, a sampling counter i is incremented, and furthermore, in Step S1019, determination is made as to whether the sampling counter i has reached a specified number of times (MAX times) or not. Namely, if the sampling counter i has not reached to a specified number of times (MAX times), processing from Step S1012 to Step S1018 described above is repeated.

In Step S1019, if the sampling counter i has reached a specified number of times (MAX times), the system goes to Step S1020, and a result of detection is outputted and displayed on the display unit 108 according to the read data a [i]: i=0 to MAX−1 in the data memory 106 therein.

[EMBODIMENT 6]

Figure 11:
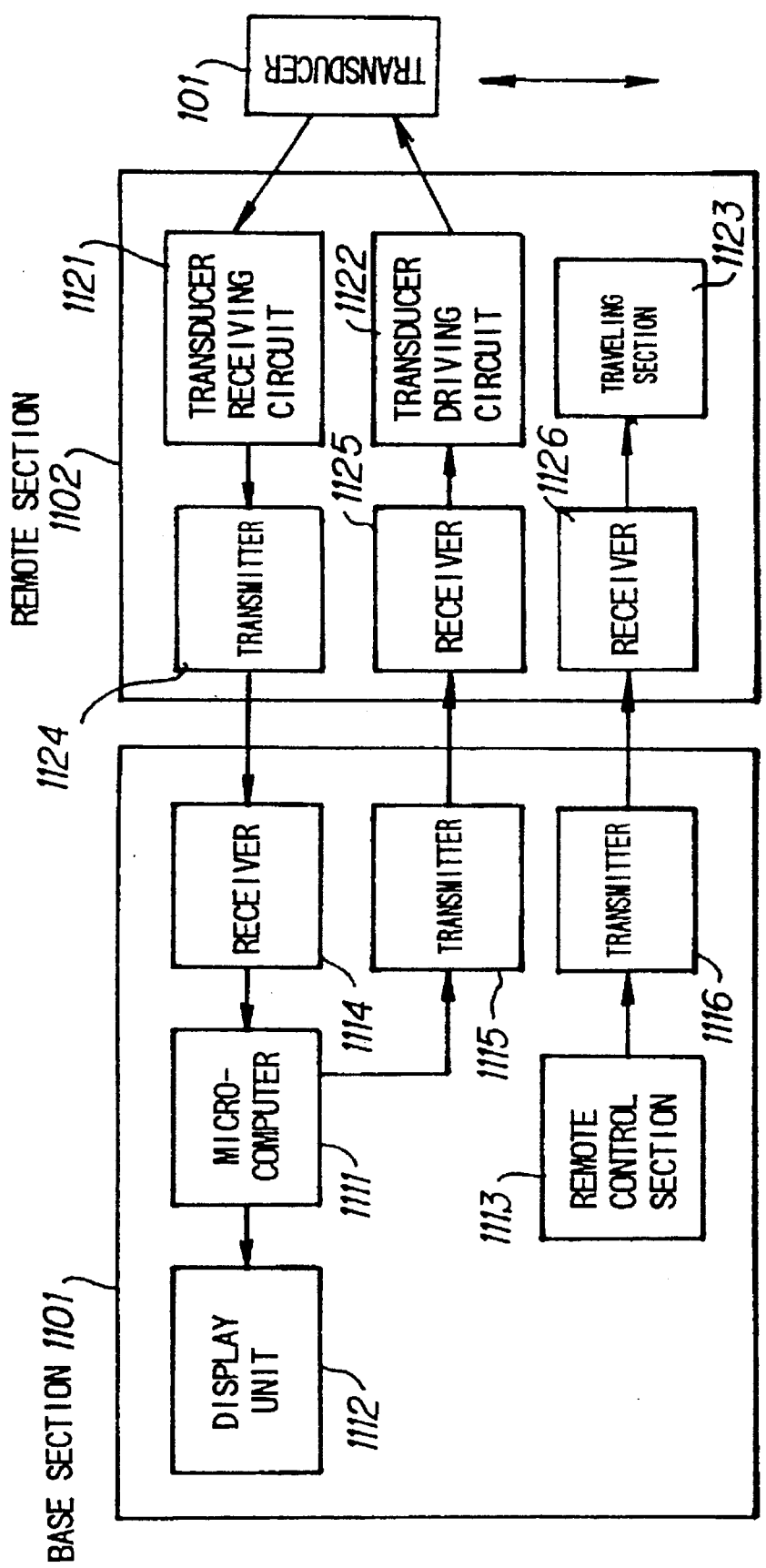
FIG. 11 is a block diagram of a fish finder according to Embodiment 6 of the present invention.
Figure 13:
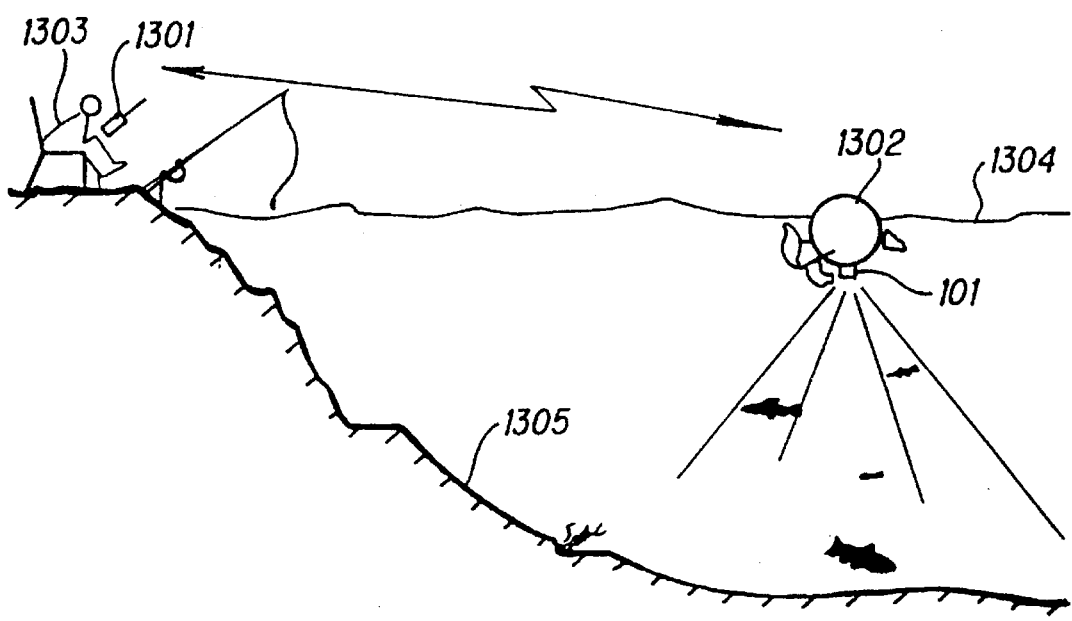
FIG. 13 is an explanatory view showing an example of a construction of the fish finder in Embodiment 6, Embodiment 7, and Embodiment 8.

FIG. 11 is a block diagram of the fish finder according to Embodiment 6 of the present invention. The fish finder of the present invention, as shown in FIG. 13, is formed with a remote section 1302 (1102) and a transducer 101 each floating on the water surface 1304 or in another state to be measured, and a base section 1301 (1101) remotely controlling the remote section on the shore.

In FIG. 11, the base section 1101 comprises a display unit 1112, a microcomputer 1111, a remote control section 1113, a receiver 1114, and transmitters 1115 as well as 1116. The remote section 102 comprises a transducer driving circuit 1122, a transducer receiving circuit 1121, a traveling section 1123, a receiver 1124, and transmitters 1125 as well as 1126.

It should be noted that the A/D converter 104, data memory (RAM) 106, and program memory (ROM) 107 shown in the configuration of Embodiment 1 each are provided in the base section 1101, but the relation connected to each other can easily be understood, and for this reason description concerning the relation thereof is omitted in FIG. 11.

Between the transmitter 1115 in the base section 1101 and the receiver 1125 in the remote section 1102, between the transmitter 1124 in the remote section 1102 and the receiver 1114 in the base section 1101, and between the transmitter 1116 in the base section 1101 and the receiver 1126 in the remote section 1102 each are connected with radio communication respectively.

At first, a control signal from the microcomputer 1111 is supplied to the transducer driving circuit 1122 via the transmitter 1115 as well as receiver 1125, a trigger pulse is transmitted from the transducer driving circuit 1122, and then supersonic wave is transmitted from the transducer 101 into water responding to the trigger pulse.

A supersonic echo from obstacles underwater or the bottom is received by the transducer 101, a received signal having a voltage level corresponding to the amplitude of the supersonic echo is outputted from the transducer 101, and the received signal is amplified in the transducer receiving circuit 1121 and detected, then converted to a digital value for a supersonic echo signal via the transmitter 1124 as well as receiver 1114 and A/D converter (not shown herein), fetched into the microcomputer 1111, and stored in the data memory (not shown herein).

Also, when the remote section 1102 should be moved along the water surface 1304, a control signal is outputted by operating the remote control section 1113 in the base section 1102, the control signal is supplied to the traveling section 1123 via the transmitter 1116 as well as receiver 1126, and the remote section 1102 can be moved to the position desired by user by means of controlling its movement.

[EMBODIMENT 7]

FIG. 12 is a block diagram of the fish finder according to Embodiment 7 of the present invention. The fish finder of the present embodiment is formed separately, like that in Embodiment 6, as shown in FIG. 13, with a remote section 1302 (1202) as well as a transducer 101, and a base section 1301 (1201).

In FIG. 12, configuration of the base section 1201 as well as remote section 1202 is characterized in that a transmitter 1116 and a receiver 1126 are omitted from that of Embodiment 6, and a control signal is outputted from the microcomputer 1211 by operating the remote control section 1113 in the base section 1102 to control the movement of the remote section 1202 and the transducer 101 along the water surface 1304.

Namely, a control signal for movement from the microcomputer 1211 according to operation of remote control section 1113 is supplied to the traveling section 1223 via the transmitter 1215 as well as receiver 1225, and the remote section 1102 is moved to the position desired by user by means of controlling for driving the traveling section 1223.

[EMBODIMENT 8]

Figure 14:
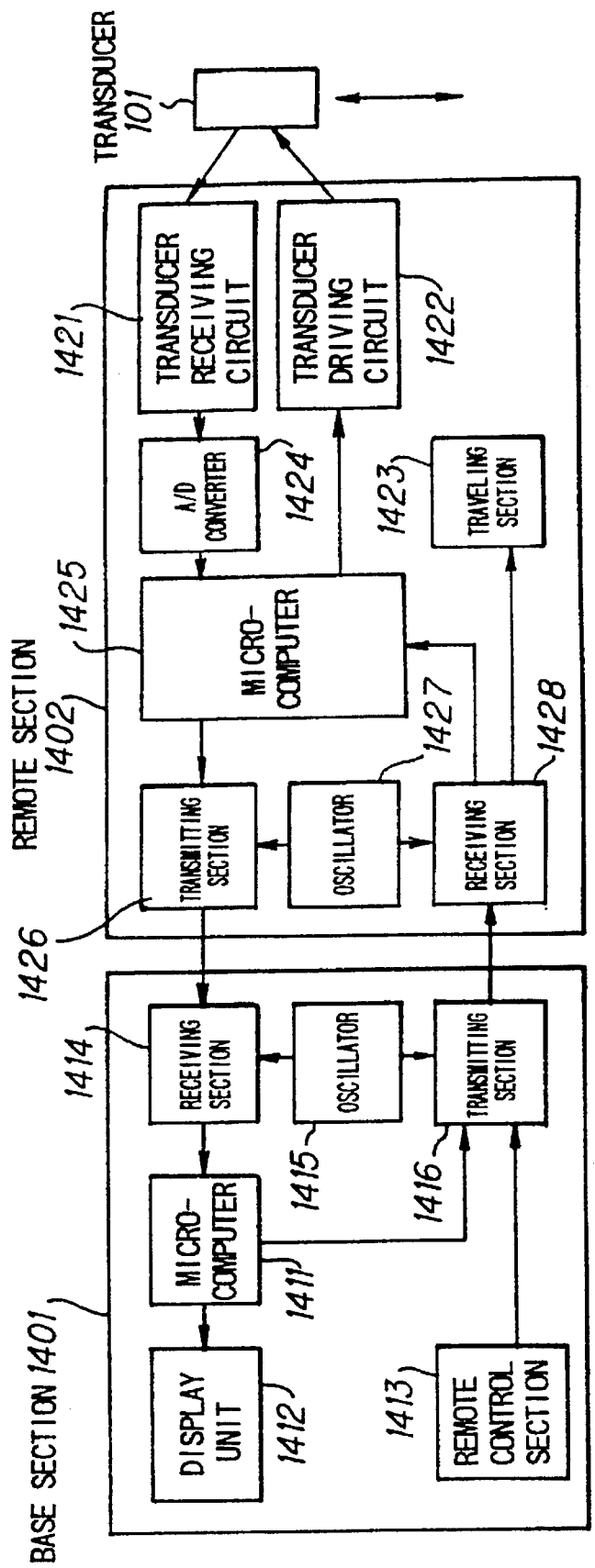
FIG. 14 is a block diagram of a fish finder according to Embodiment 8 of the present invention.
Figure 15:
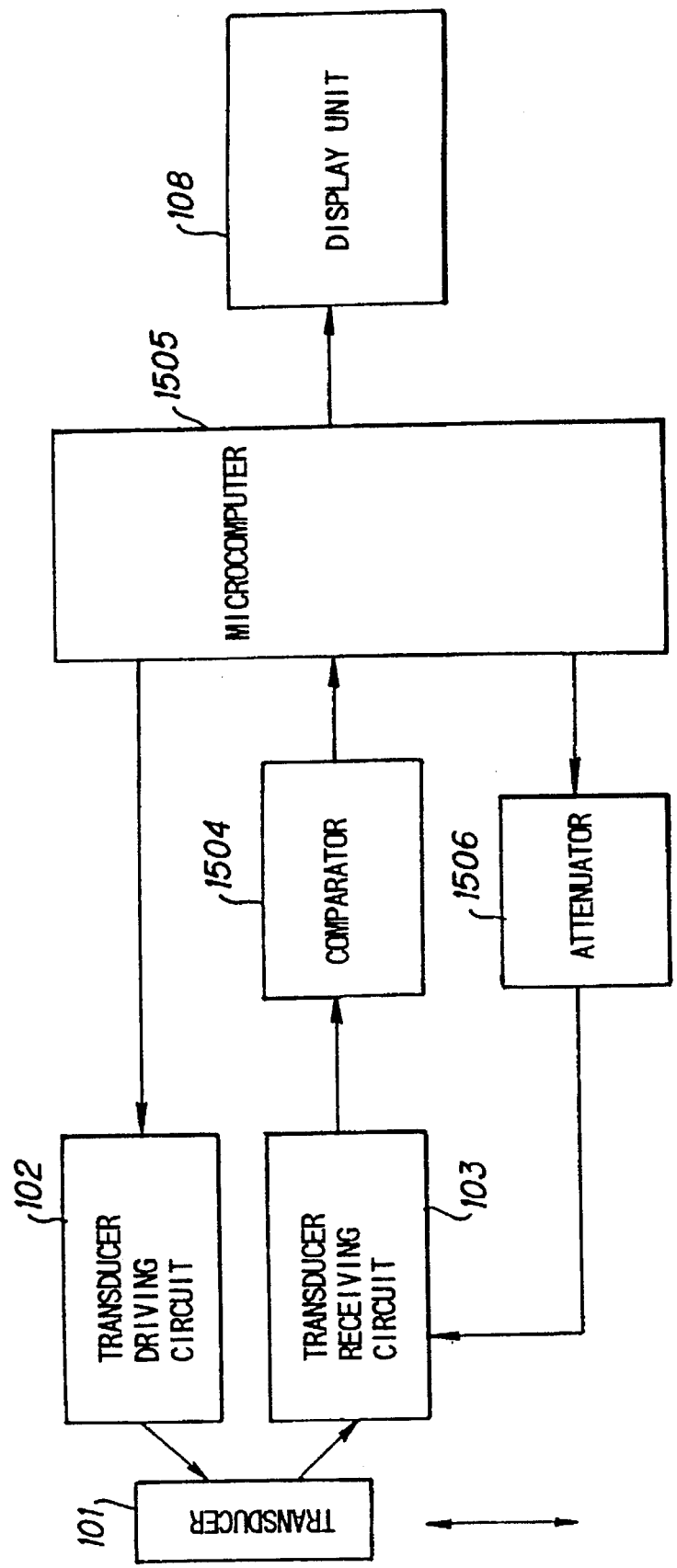
FIG. 15 is a block diagram of a conventional type of fish finder.

FIG. 14 is a block diagram of the fish finder according to Embodiment 8 of the present invention. The fish finder of the present embodiment is formed separately, like that in Embodiment 6, as shown in FIG. 13, with a remote section 1302 (1402) as well as a transducer 101, and a base section 1301 (1401).

In FIG. 14, the base section 1401 comprises a display unit 1412, a microcomputer 1411, remote control section 1413, a receiving section 1414, and an oscillator 1415 as well as a transmitting section 1416, and the remote section 1402 comprises a transducer driving circuit 1422, a transducer receiving circuit 1421, a traveling section 1423, a A/D convertor 1424, a microcomputer 1425, a transmitting section 1426, a transmitter 1427 and a receiving section 1428.

It should be noted that the data memory (RAM) 106 and the program memory (ROM) 107 as shown in the configuration of Embodiment 1 is provided in the base section 1101, but the relation connected to each other can easily be understood, and for this reason a description concerning the relation thereof is omitted in FIG. 14.

Between a transmitting section 1416 in the base section 1401 and a receiving section 1428 in the remote section 1402, and between a transmitting section 1426 in the remote section 1402 and a receiving section 1414 in the base section each are connected to each other with digital radio communication respectively.

At first, a control signal is outputted from the microcomputer 1411 in the base section 1401, and the control signal is supplied to the microcomputer 1425 in the remote section 1402 via the transmitting section 1416 and the receiving section 1428. In the transducer driving circuit 1122, a trigger pulse is transmitted according to the control signal from the microcomputer 1425, and then a supersonic wave responding to the trigger pulse is transmitted from the transducer 101 into the water.

The supersonic echo from obstacles under water or the bottom is received by the transducer 101, and a received signal having the voltage level corresponding to the amplitude of the supersonic echo is outputted from the transducer 101. This received signal is amplified at the transducer receiving circuit 1421, detected, and then converted to a digital value for the supersonic echo signal according to the microcomputer 1425, supplied to the microcomputer 1411 via the microcomputer 1425, the transmitting section 1426 and the receiving section 1414, and stored in the data memory (not shown herein).

In the microcomputer 1411, processing like those in the fish finder each from Embodiment 1 to Embodiment 5 is executed, and a result of the detection is outputted and displayed on the display unit 1412.

Also, if the remote section 1402 should be moved along the water surface 1304, a control signal is outputted by operating the remote control section 1413 in the base section 1402. The control signal is supplied to the traveling section 1423 via the transmitting section 1416 and the receiving section 1428, and then the remote section 1402 can be moved to the position desired by user by means of controlling its movement.

In the fish finder of the present embodiment, the base section 1401 and the remote section 1402 are connected with digital radio communication, and with this feature, the fish finder has such advantages as below.

(1) A timing signal required in Embodiment 6 and Embodiment 7 is not necessary.

(2) Various data such as temperature data, depth data, fish data, velocity data, gyro data and GPS data or the like can easily be added to the data for radio communications.

(3) A position where the user is, a position of the remote section 1402 as well as the transducer 101, a direction of moving or the like can be displayed on another screen of the display unit 1412 by using each data described above (2).

(4) As a half-duplex communication is executed, the base section 1401 and the remote section 1402 each may provide only one piece of local oscillators 1415 and 1427 respectively, and thus configuration is simple.

(5) By having an ID code with data, multi-channelization can be realized, so that malfunction in the system does not occur even if radio communications is concentrated at the same time.

(6) Also, as data is intermittently transmitted in the base section 1401, even if a plurality units of the base sections are simultaneously used, the remote section 1402 can keep on operating as long as a slight gap is in between each timing for intermittent transmission.

(7) Also, if multi-channelization is realized with an ID code, a circuit for PLL for radio communications is not required, and thus cost reduction is achieved.

(8) Furthermore, data such as a battery low signal can be convoluted by turning ON/OFF modulation of a responding echo signal.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A fish finder comprising:

a transducer for transmitting a supersonic wave and receiving an echo from obstacles under water;

a receiver for converting an echo received by said transducer to a supersonic echo signal;

a controller for measuring a depth of an obstacle based on a timing of receipt of said supersonic echo signal, obtaining an echo level depending on a physical quantity of said supersonic echo signal, and also determining the condition of the bottom depending on echo levels of a series of supersonic waves; and a display unit having a first display area for providing graphic displays of said obstacle as well as said bottom with a depth scale and a second display for providing displays of said echo level in correspondence to a depth scale in said first display area;

wherein said controller provides a result of detection at a position of corresponding depth scale on said first display with the result depicted as a gradation or a pattern type corresponding to said echo level, and also provides graphic displays of said echo level at a position of corresponding depth on said second display area.

2. A fish finder comprising:

a transducer for transmitting a supersonic wave and receiving an echo from obstacles under water;

a receiver for converting an echo received by said transducer to a supersonic echo signal;

a controller for measuring a depth of an obstacle based on a timing of receipt of said supersonic echo signal, correcting said supersonic echo signal according to an attenuation rate associated with propagation of a transmitted supersonic wave, then obtaining an echo signal according to a physical quantity of the supersonic wave having been subjected to attenuation correction, and also determining the bottom depending on echo levels of supersonic echo signals each subjected to attenuation correction, and a display unit having a first display area for providing graphic displays of said obstacle and said bottom with a depth scale;

wherein said controller provides a result of detection at a position of corresponding depth scale on said first display area with the result depicted as a gradation or a pattern type corresponding to said echo signal after said attenuation correction.

3. A fish finder according to claim 2, wherein said controller executes a second correction, after said attenuation correction, by subtracting a prespecified echo level from an echo level of said supersonic echo signal after attenuation correction, and displays a result of detection on a position corresponding depth scale on said first display area with as a gradation or a pattern type corresponding to an echo level of said supersonic echo signal after said second correction.

4. A fish finder according to claim 3, wherein said prespecified echo level is a function of said depth.

5. A fish finder according to claim 2, wherein said controller executes a second correction, after said attenuation correction, by subtracting a prespecified echo level from an echo level of said supersonic echo signal after said attenuation correction, the prespecified echo level corresponding to a specified depth range, and displays a result of detection at a position of corresponding depth scale on said first display area with as a gradation or a pattern type corresponding to an echo level of said supersonic echo signal after said second correction.

6. A fish finder according to claim 5, wherein said prespecified echo level is a function of said depth of said obstacle.

7. A fish finder comprising:

a transducer transmitting a supersonic wave and receiving an echo from obstacles under water;

a receiver for converting the echo received by said transducer to a supersonic echo signal;

a controller for measuring a depth of an obstacle based on a timing of receipt of said supersonic echo signal, obtaining an echo level depending on a physical quantity of said supersonic echo signal, removing a supersonic echo signal having an echo level less than a prespecified attenuation level, correcting an attenuation associated with propagation of a transmitted supersonic wave for a supersonic echo signal which is to be removed, prior to its removal, obtaining an echo level depending on a physical quantity of said supersonic echo signal after being subjected to attenuation correction, and determining the condition of the bottom based on echo signals of a series of supersonic echo signals which have been subjected to attenuation correction; and a display unit having a first display area for providing graphic displays of said obstacle as well as of said bottom with a depth scale;

wherein said controller provides a result of detection at a position of corresponding depth scale on said first display area with the result depicted as a gradation or a pattern type corresponding to said echo level after attenuation correction.

8. A fish finder according to claim 7, wherein said controller executes a second correction, after said attenuation correction, by subtracting a prespecified echo level from an echo level of said supersonic echo signal after said attenuation correction, and displays a result of detection at a position of corresponding depth scale on said first display area as a gradation or a pattern type corresponding to an echo level of said supersonic echo signal after said second correction.

9. A fish finder according to claim 8, wherein said prespecified echo level is a function of said depth.

10. A fish finder according to claim 7, wherein said controller executes a second correction, after said attenuation correction, for subtracting a prespecified echo level from an echo level of said supersonic echo signal after said attenuation correction, the prespecified echo level corresponding to a specified depth range, and displays a result of detection at a position of corresponding depth scale on said first display area as a gradation or a pattern type corresponding to an echo level of said supersonic echo signal after said second correction.

11. A fish finder according to claim 10, wherein said prespecified echo level is a function of said depth of the obstacle.

12. A fish finder according to claim 7, wherein said display unit has a third display area for a user to specify said prespecified attenuation level or said prespecified echo level.

13. A system for detecting and locating objects in a body of water comprising:

a transmitting circuit for sending a sound signal directed to an object;

a receiving circuit for receiving an echo signal reflected from said object;

a computer coupled to said transmitting and receiving circuits for initiating said sound signal and processing said echo signal; and a display responsive to said computer for presenting a position of said object with respect to a depth of said body of water at which said object is located, and for indicating an echo level of said echo signal reflected from the object at said depth, simultaneously with presenting said position.

14. The system of claim 13, wherein said display presents a bottom surface of said body of water and indicates the echo level of said echo signal reflected from said bottom surface.

15. The system of claim 13, wherein said display comprises a first portion for presenting said position, and a second portion for indicating the echo level of said echo signal.

16. The system of claim 13, wherein said display comprises a bar graph display portion for presenting data processed by said computer in a rectangular format with height proportional to the echo level of said echo signal.

17. The system of claim 16, wherein said rectangular format corresponds to a specific depth of said body of water.

18. The system of claim 17, wherein said display further comprises an object display portion for displaying the object located at said specific depth.

19. The system of claim 13, wherein said computer comprises a data memory for storing data corresponding to said echo signal.

20. The system of claim 19, wherein said data memory accumulates the data for a predetermined number of echo signals.

21. The system of claim 13, wherein said objects comprises a group of fish.

22. The system of claim 13, wherein said computer provides a correction for attenuation of said echo signal based on the depth at which the object is located.

23. The system of claim 13, wherein said computer processes said echo signal so as to prevent noise from being displayed.

24. The system of claim 13, wherein said computer adjusts sensitivity of an echo signal processing circuit to avoid processing unnecessary echo signals.

25. The system of claim 24, wherein said display presents a menu for adjusting the sensitivity to obtain an optimal image of the object.

26. The system of claim 13, wherein said computer reduces echo levels of echo signals reflected from the object which is located in a preset depth range of said body of water, by a preset amount.

27. The system of claim 26, wherein said display presents a menu for selecting said preset depth range and said preset amount.

28. The system of claim 27, wherein said display forms an icon on a screen to present the object.

29. The system of claim 28, wherein said display presents a menu for switching between a mode of displaying the icon and a mode of displaying a dot pattern.

30. The system of claim 28, wherein said icon represents a group of fish.

31. The system of claim 13, wherein said sound signal is transmitted at an ultrasonic frequency.

32. The system of claim 13, wherein said computer and said display are located in a base section, and said transmitting and said receiving circuits are located in a section remote with respect to said base section.

33. The system of claim 32, wherein said remote section is immersed into said body of water.

34. The system of claim 32, wherein said remote section further comprises a transmitting unit coupled to said receiving circuit for communicating with said computer in said base section.

35. The system of claim 34, wherein said remote section further comprises a receiving unit coupled to said transmitting circuit for communicating with said computer in said base section.

36. The system of claim 35, wherein said remote section further comprises a traveling unit remotely controlled from said base unit to move said remote section to a selected position.

37. The system of claim 36, wherein said base unit further comprises a remote control unit for moving said remote section to in the selected position.

38. The system of claim 37, wherein said base section further comprises a transmitter coupled to said remote control unit for controlling movement of said remote section through a radio link.

39. The system of claim 37, wherein said remote control unit controls movement of said remote section through said computer.

40. The system of claim 35, wherein said remote section further comprises an additional computer for providing digital radio communication with said base section.

41. A method of detecting and locating objects in a body of water comprising the steps of:

(a) transmitting an ultrasonic wave directed to an object;

(b) receiving an echo signal reflected from the object;

(c) processing the echo signals to determine echo levels indicating location of the object;

(d) comparing the echo levels with a reference noise level to suppress noise by removing echo signals having echo levels less than the reference noise level;

(e) providing a correction of the echo levels for attenuation of the echo signals, depending on depth of the body of water at which the object is located;

(f) reducing the echo levels corresponding to a selected depth range of the body of water within which the object is located, by a selected amount, to eliminate bubble noise; and (g) adjusting sensitivity of means for processing the echo signals to eliminate processing of unnecessary echo signals.

42. The method of claim 41, wherein said steps (a)–(g) are carried out a preset number of times to generate data for indicating location of the objects.

43. The method of claim 42 further comprising the step of displaying said data.

* * * * *